United States Patent [19]

Benson et al.

[11] Patent Number: 4,934,246

[45] Date of Patent: Jun. 19, 1990

[54] WIDE ANGLED TRAPEZOIDAL PERISCOPE

[75] Inventors: William M. Benson, Mountain View; Bruce G. Heron, Morgan Hill, both of Calif.

[73] Assignee: FMC Corporation, Chicago, Ill.

[21] Appl. No.: 251,271

[22] Filed: Sep. 30, 1988

[51] Int. Cl.⁵ ............................ F41H 5/26; G02B 23/08
[52] U.S. Cl. .................................... 89/36.14; 350/540; 350/575
[58] Field of Search ................. 89/36.14, 36.17, 36.13, 89/36.1, 36.8, 36.2; 350/540, 541, 543, 544, 557, 575

[56] References Cited

U.S. PATENT DOCUMENTS

| | | | |
|---|---|---|---|
| 1,225,646 | 5/1917 | Kessler | 350/540 |
| 2,130,006 | 9/1938 | Gundlach | 350/543 |
| 2,436,374 | 2/1948 | Birdsall | 89/36.14 |
| 3,309,962 | 3/1967 | Lykam | 89/41 |
| 3,456,999 | 7/1969 | Hopp | 350/540 |
| 3,482,897 | 12/1969 | Hopp | 89/36.14 |
| 3,724,323 | 4/1973 | Selle | 89/36.14 |
| 3,790,248 | 2/1974 | Kellow | 350/10 |
| 3,854,377 | 12/1974 | Schiele | 89/36.14 |
| 4,159,669 | 7/1979 | Jackson et al. | 89/36.14 |
| 4,275,639 | 6/1981 | Garber | 89/36.14 |
| 4,346,915 | 8/1982 | LeBlanc | 89/36.14 |
| 4,436,374 | 3/1984 | Krueger | 350/540 |
| 4,561,733 | 12/1985 | Kreischer | 350/575 |
| 4,572,625 | 2/1986 | Arndt et al. | 350/541 |
| 4,583,444 | 4/1986 | Jackson | 89/36.14 |
| 4,587,880 | 5/1986 | Sprafke | 89/36.14 |
| 4,745,152 | 5/1988 | Fock et al. | 524/718 |

FOREIGN PATENT DOCUMENTS

| | | | |
|---|---|---|---|
| 151204 | 10/1937 | Austria | 89/36.14 |
| 299009 | 10/1919 | Fed. Rep. of Germany | 350/540 |
| 2810206 | 4/1981 | Fed. Rep. of Germany | 89/36.14 |
| 3202637 | 8/1983 | Fed. Rep. of Germany | 350/540 |
| 3205430 | 8/1983 | Fed. Rep. of Germany | 350/540 |
| 3627716 | 2/1988 | Fed. Rep. of Germany | 350/540 |
| 535474 | 11/1955 | Italy | 350/540 |
| 22532 | of 1907 | United Kingdom | 350/540 |
| 994015 | 6/1965 | United Kingdom | 350/540 |
| 1281084 | 7/1972 | United Kingdom | 89/36.14 |
| 2089519 | 6/1982 | United Kingdom | 89/36.14 |

Primary Examiner—Charles T. Jordan
Assistant Examiner—Stephen Johnson
Attorney, Agent, or Firm—A. J. Moore; R. C. Kamp; R. B. Megley

[57] ABSTRACT

A wide angle trapezoidal periscope is disclosed having an upper trapezoidal housing and a smaller lower trapezoidal housing secured to said upper housing having optics sealed therein which include parallel upper and lower windows and parallel upper and lower mirrors. When used on military vehicles, the lower trapezoidal periscope housings are inserted within evenly and closely spaced trapezoidal openings in the rim of a hatch and are secured to the hatch with corner connectors to clamp non-parallel walls of said upper housings within about ⅛ of an inch of the adjacent non-parallel walls of the next adjacent trapezoidal housing. Each periscope provides a vertical field of view of about 43° and a horizontal field of view of about 140°.

13 Claims, 9 Drawing Sheets

FIG_1

FIG_2

FIG_22

FIG_23

WIDE ANGLED TRAPEZOIDAL PERISCOPE

BACKGROUND OF THE INVENTION

1. Field of the Invention

The present invention pertains to trapezoidal wide angle periscopes for military vehicles or the like, and more particularly relates to a trapezoidal periscope which provides improved vision, laser protection, improved ballistic protection, improved sealing against rain and nuclear, biological and chemical agents, and are easily installed.

2. Description of the Prior Art

In general, observation for the crew of a combat vehicle is normally provided by vision blocks, or for more heavily armored vehicles, by periscopes. These prior art periscopes normally have a rectangular cross section, and are installed around the periphery of a hatch (see prior art FIG. 21A). They are usually designed to be installed from inside the vehicle. The rectangular cross section and interior mounting fasteners between periscopes prevent the periscopes from being nested close together thus restricting the horizontal field of view.

Assignee's Garber U.S. Pat. No. 4,275,639 and Lykam U.S. Pat. No. 3,309,962 disclose the location of other types of periscope on military vehicles.

SUMMARY OF THE INVENTION

In accordance with the present invention, the trapezoidal periscope of the present invention is designed to include the following features and advantages:

1. The periscope includes an exterior head portion that is larger than its interior body portion which provides improved vision and helps prevent the periscope from being blown into the vehicle by an overhead explosion.

2. The periscope is designed to be installed on the outside of a hatch cover rather than around the periphery of the hatch opening as used in certain prior art devices thereby improving the field of view by placing the periscope closer to the crew members eyes while maintaining an adequate hatch opening. Military standards require a minimum circular opening of 22" diameter with 28" diameter being preferred. This feature improves the crew's protection when viewing from a popped hatch cover, and also makes it unnecessary for the crew members to change the position of their body and their seat when changing from closed hatch cover, to popped open hatch cover operation.

3. The periscope is attached to the vehicle with corner clamps to minimize the space between periscopes and to provide flexibility of mounting.

4. The periscope seals on the exterior of the vehicle so as to be self draining and to prevent trapping of nuclear, biological and chemical agents, and rain or other liquids.

5. The exterior or upper periscope housing forms a small overhanging horizontal visor to protect the exterior window from rain and falling objects. The exterior window is glass to prevent it from being scratched when cleaned.

6. The interior or lower window is a hard coated plastic which provides limited scratch resistance while eliminating the possibility of glass fragments being propelled into a crew member's eyes by a ballistic impact into the periscope.

7. The interior and exterior windows are parallel to prevent distortion of the scene being viewed, but are not vertical. The exterior window is tilted toward the ground to further protect the glass and to improve the vehicle concealment. The overhanging visor and tilting of the exterior window reduces the likelihood of sunlight reflecting from the exterior window. When the sunlight is so low that it directly hits the exterior window, the tilt of the glass directs the reflection downwardly toward the vehicle roof or ground instead of toward the enemy.

8. The exterior glass window includes a laser filter that protects the crew's eyesight from low to moderate intensity lasers that may appear on future battlefields.

9. The interior of the periscope contains a horizontal spacer of transparent polycarbonate that prevents ballistic fragments and shock waves from entering the vehicle.

DESCRIPTION OF THE PREFERRED EMBODIMENT

The wide angle trapezoidal periscopes 20 (FIGS. 1-4) of the present invention are illustrated as being used on a military vehicle V in both the driver's hatch cover 22 and the commander's hatch cover 24. As illustrated, five periscopes are used in the driver's hatch cover while the commander's hatch cover has eight periscopes to provide 360° of viewing through the several periscopes. Each hatch cover includes a dome for receiving the operator's head and a rim for receiving the trapezoidal periscopes.

Although the wide angle periscopes 20 have been illustrated as being used on a military vehicle, it will be understood that the periscopes may be used in other environments, military or civil. For example, the periscopes may be used on bomb shelters, prison observation towers, and other civilian endeavors when it is important to visually observe tests or the like which may cause injury to personnel.

When used on military vehicles V, each periscope 20 includes an upper armor trapezoidal housing 26 (FIGS. 3-5) and a lower trapezoidal housing 28. The lower housing is smaller than the upper housing and extends through trapezoidal openings 29 in the associated hatches 22 and 24.

Figure 1:
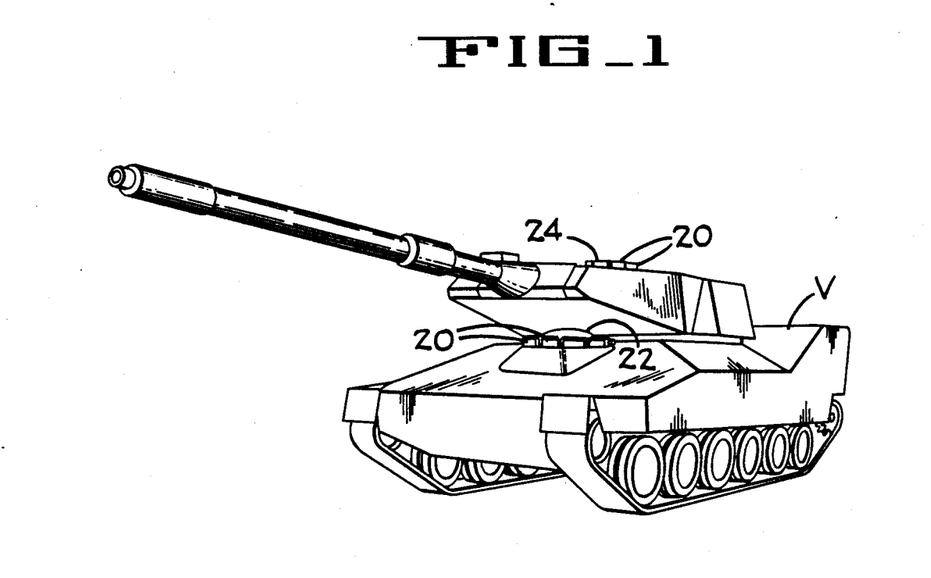
FIG. 1 is a perspective of a military vehicle having a driver's hatch with trapezoidal periscopes in the hatch cover extending in excess of 180° around the hatch cover, and a commander's hatch cover having trapezoidal periscopes therein extending 360° around the axis of the commander's hatch cover.
Figure 2:
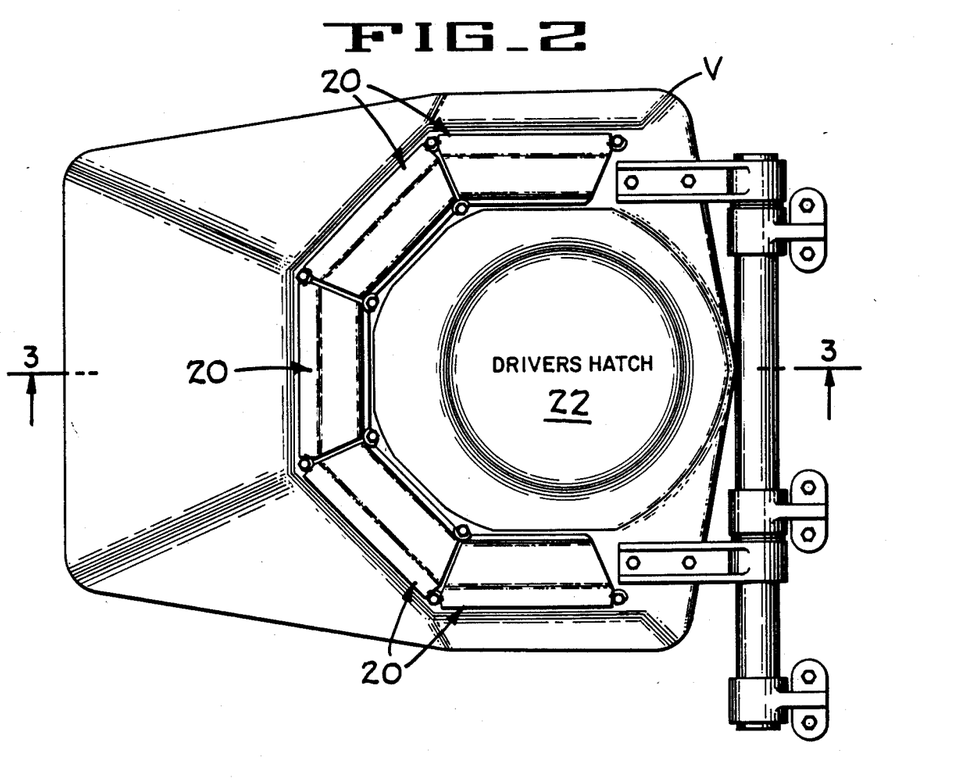
FIG. 2 is an enlarged plan of a driver's hatch cover illustrating the upper portion of five closely spaced trapezoidal periscopes.
Figure 3:
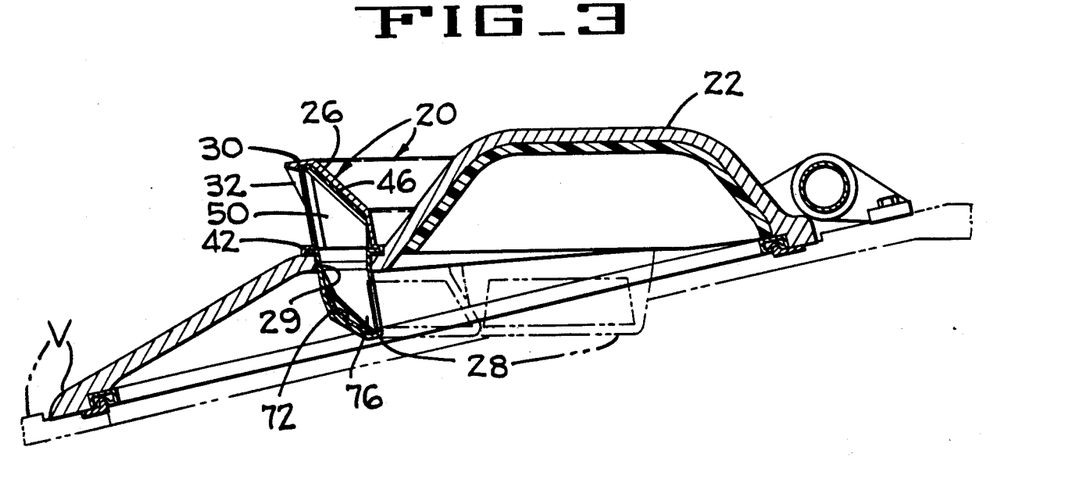
FIG. 3 is a vertical section taken along lines 3—3 of FIG. 2 illustrating a closed driver's hatch cover and a trapezoidal periscope in operative position relative to a horizontal plane.
Figure 4:
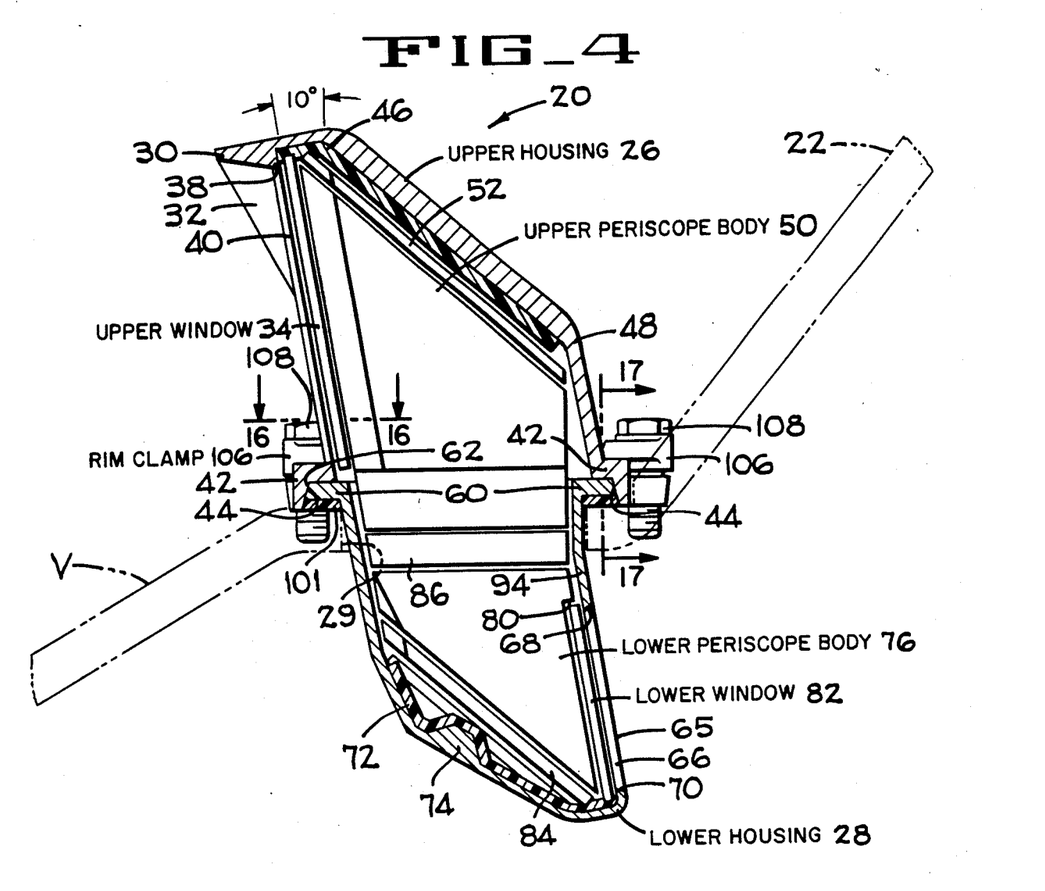
FIG. 4 is an enlarged vertical section of a periscope illustrating the components thereof.
Figures 12, 12A, 13:
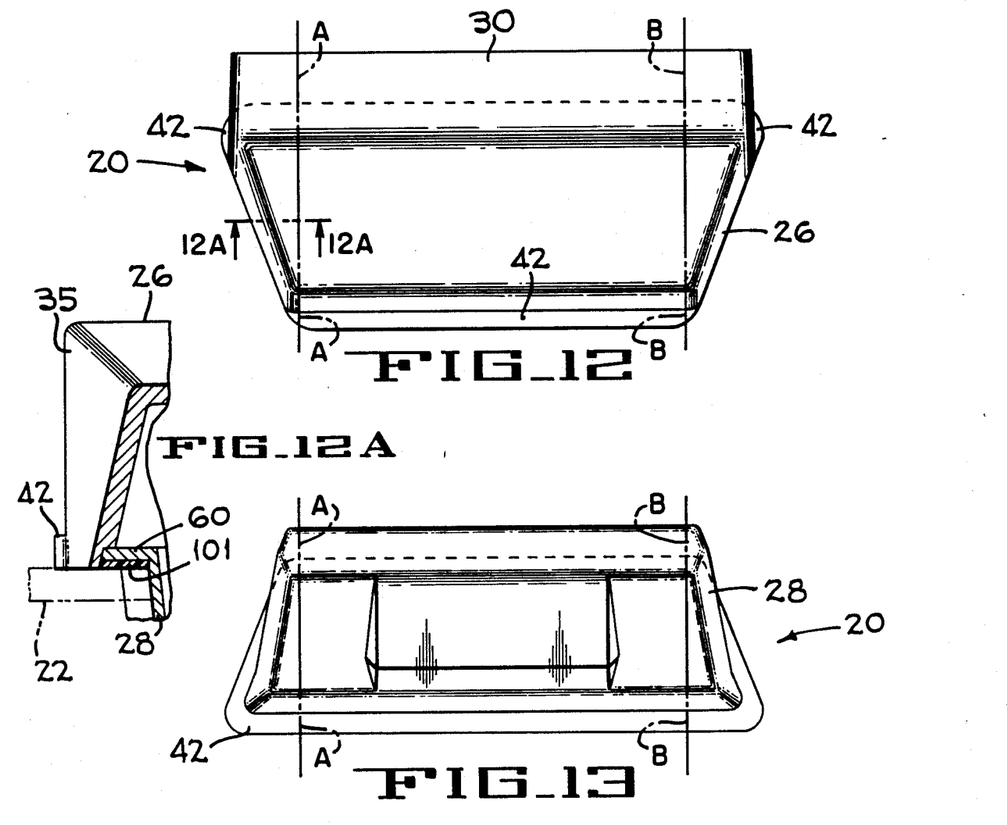
FIG. 12 is a plan view looking the direction of arrows 12—12 of FIG. 11 illustrating the trapezoidal shape of the upper housing.
FIG. 12A is a section taken along lines 12A—12A of FIG. 12 illustrating the manner in which the non-parallel walls of the upper and lower housings are connected together.
FIG. 13 is a bottom view looking in the direction of arrows 13—13 of FIG. 11 illustrating the trapezoidal shape of the bottom of the lower housing.
Figure 14:
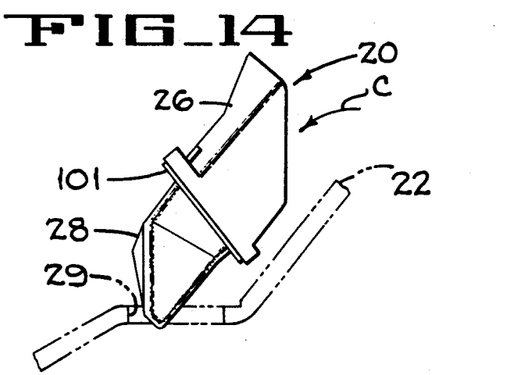
FIG. 14 is an operational view in side elevation illustrating the manner in which the trapezoidal periscopes are inserted within their trapezoidal slots in the hatch cover.
Figure 15:
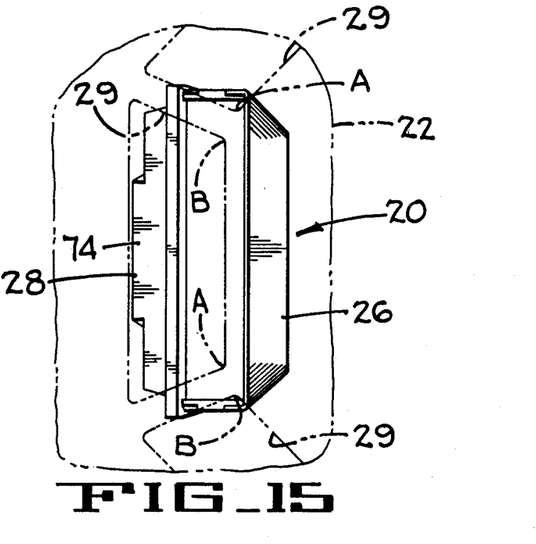
FIG. 15 is a diagrammatic plan view of FIG. 14.
Figure 16:
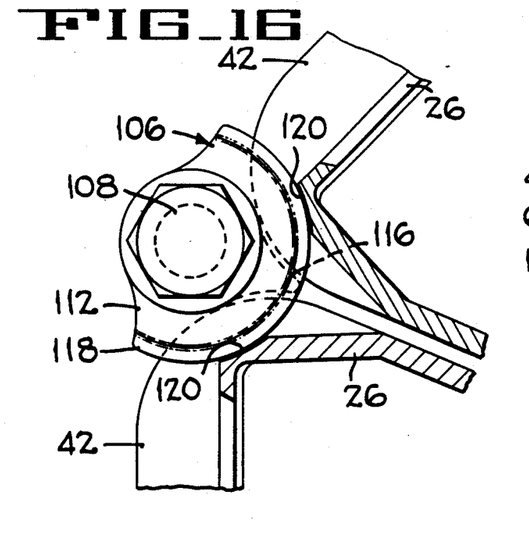
FIG. 16 is an enlarged plan view with parts in section taken along lines 16—16 of FIG. 4 illustrating a rim clamp in clamping engagement with corners of two periscopes.
Figure 17:
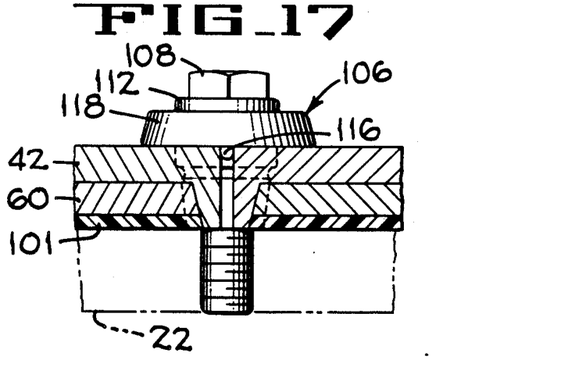
FIG. 17 is a section taken along lines 17—17 of FIG. 4 illustrating the rim clamp in clamping engagement with corners of the rims of two adjacent periscopes.
Figure 18:
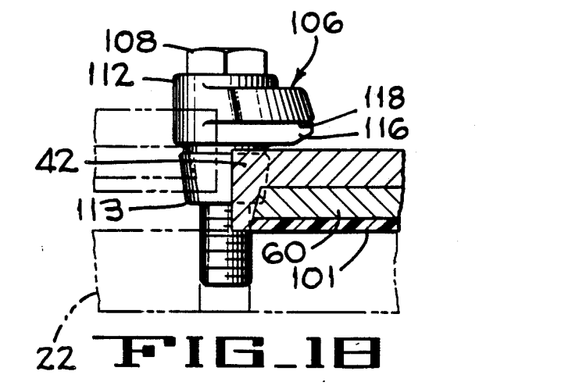
FIG. 18 is a section similar to FIG. 17 but illustrating the rim clamp loosened and rotated to a position allowing one of the periscopes to be removed from the hatch cover.
Figure 19:
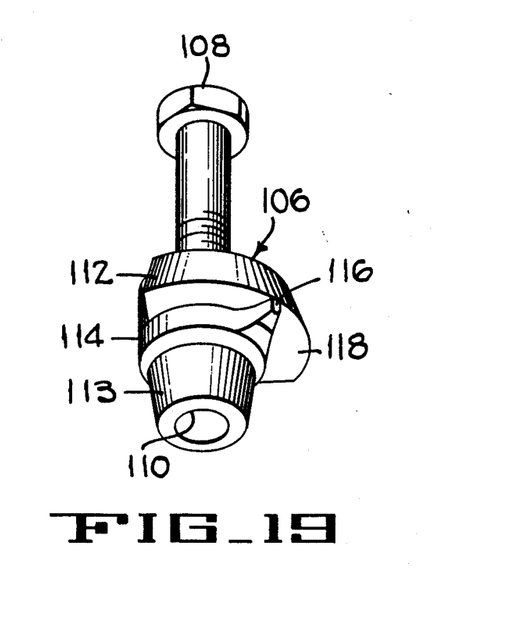
FIG. 19 is a perspective of the rim clamp illustrating a centering tongue for preventing rotation of the rim clamp when in clamping position.

The upper housing 26 is presently formed as a precision casting of high strength aluminum such as A-356.0-T6 or A-357.0-T6. The upper housing can easily be precisioned cast from ballistic armor steel for a higher level of overhead ballistic protection, eliminating the need for any additional ballistic covers to be added. The upper housing 26 includes an upper generally horizontal visor 30 with upper side wings 32 which protect an upper glass window 34 from rain and falling objects. A window opening 36 is defined by an upper lip 38 which communicates with side lips 40 and a portion of a bottom or rim flange 42 which cooperate to maintain the glass window 34 within the upper housing 26. The rim 42 extends around the front and rear of the lower periphery of the upper housing and includes beveled inner edges 44 (FIG. 4). As shown in FIG. 12A, the non-parallel side walls 35 (only one being shown) of the upper trapezoidal housing 26 do not include outwardly projecting bottom rims, such as the rims 42 of the parallel walls of the upper trapezoidal housing 26 thus permitting adjacent non-parallel walls of adjacent upper housing to be placed very close together as illustrated in FIG. 2.

An upper shock pad 46 (FIGS. 4 and 5) conforms to the shape of a rear wall 48 of the upper housing and includes a self-stick adhesive on one side for bonding to the inner surface of the rear wall 48.

An upper periscope body 50 (FIGS. 4–10) is formed from transparent methacryolate plastic, Type I or II grade A or C, Specification L-P-391 or optical specification MIL-P-8184. All surfaces are polished to military specification MIL-0-13830, quality 80-50 except non-optical edges around the periphery of the upper periscope body. These non-optical surfaces of the upper transparent periscope body 50, the upper window 34, and an upper mirror 52 are glass bead blasted to a matte finish and are painted black with MIL-C-4616A paint. Also, all optical surfaces are polished, the optical surface flatness is within four wave lengths of 632 nm over any square inch portion, and with the clear aperture to be within 0.020 inches of all edges.

The peripheral edges of an upper mirror 52 and the upper window 34 are bonded to the upper periscope body 50. The upper window 34 is formed from a tempered laser filter glass, heat absorbing type, with an optical density of about 3.0 at 1.06 microns. The filter meets medium intensity requirements for distortion and waves. The upper mirror 52 is formed from Type I, class I, optical glass with silvering qualities which conform to specification DD-451.125. The surface polish should satisfy specifications MIL-0-13830, quality 80-50. The surface is aluminized in accordance with military specification MIL-M-13508. The clear aperture is within 0.020 inches of all edges. The upper transparent body 50, the upper mirror 52, and the upper window 34 are then inserted in the upper housing 26 preferably while the upper housing is inverted.

The lower trapezoidal housing 28 (FIGS. 4 and 5) is smaller than the upper housing 26 and is cast from the same type of aluminum armor material as the upper housing 26. The lower housing 28 includes an upper rim 60 having a beveled surface 62 which mates with the beveled inner edge 44 of the bottom flange 42 of the upper trapezoidal housing 26 to seal the two housings together when assembled as shown in FIG. 4.

Figure 5:
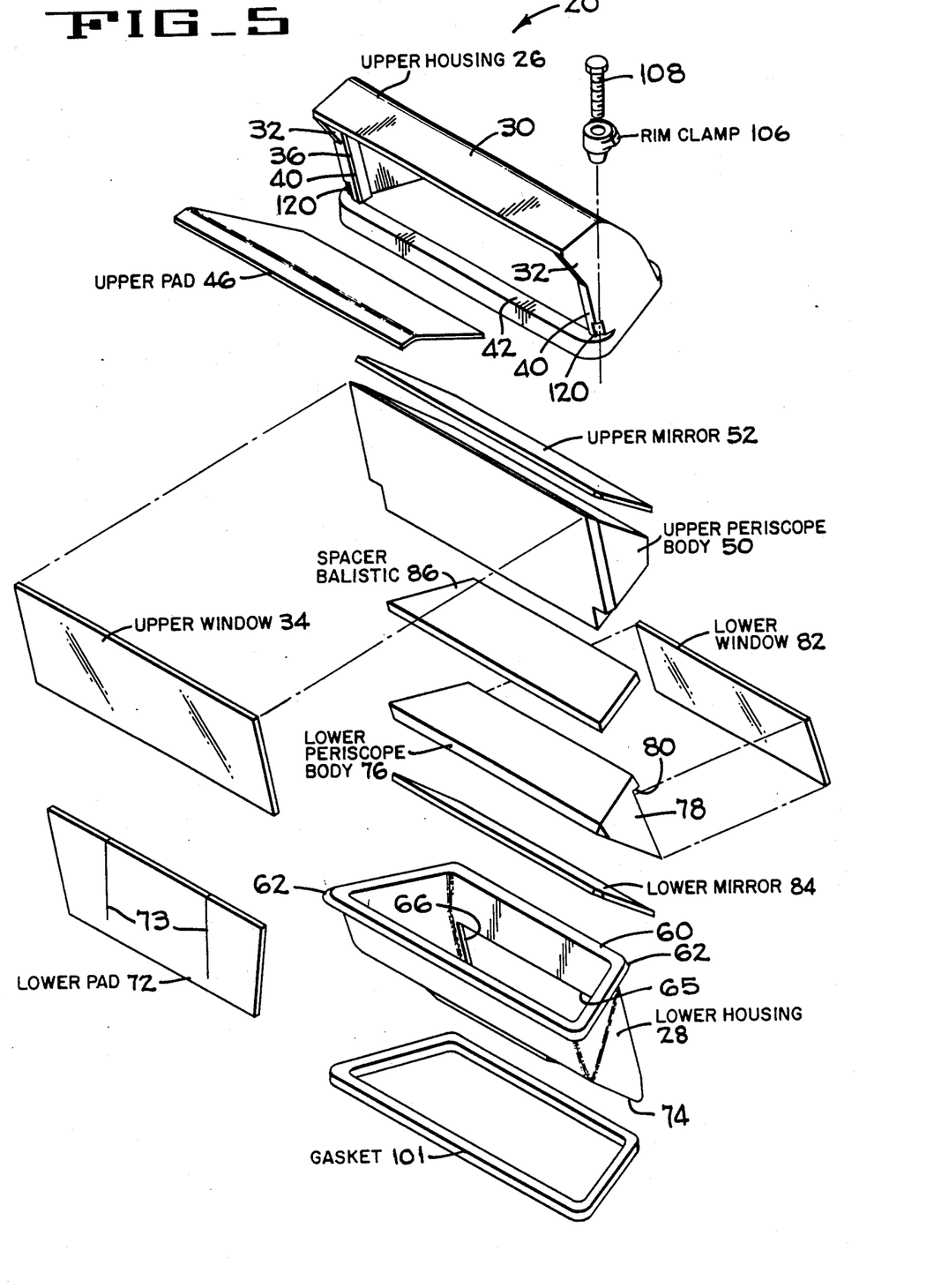
FIG. 5 is an expanded perspective illustrating the several components of the periscope.

Each lower trapezoidal housing 28 is shaped in vertical cross section as illustrated in FIG. 4, with FIG. 5 illustrating the trapezoidal shape.

Each lower housing 28 includes a lower window opening 65 defined by upright side edges 66 (only one being shown) an upper edge 68 and a lower edge 70 (FIG. 4). A lower shock pad 72 is slitted at 73 to conform to the shape of, and is bonded to, an inclined bottom wall 74 of the lower housing 28 by self-stick adhesive.

A lower optical periscope body 76 (FIGS. 4–10) is formed from transparent plastic of the same type and grade as that of the upper periscope body 50 and is surface polished to the same specifications as stated in regard to the upper periscope body. The narrow non-optical edges of the lower periscope body 76 are treated in the same way as equivalent surfaces of the upper body.

The upper surface of the lower optical periscope body 76 is shaped in the form of a trapezoid as illustrated in FIG. 5 with the upright side walls 78 being of generally V-shape with a notch 80 formed in the major portion of the outer surface for receiving a lower periscope window 82.

The lower window 82 is formed from the same type of plastic as that used in the upper body 50 and lower body 76, and the non-optical edges of the window are bonded in the notch 80 in the position shown in FIG. 4. The outer surface of the lower plastic window is coated with an abrasive resistant coating to prevent optical damage to the lower plastic window.

A lower mirror 84 is formed from the same type of glass and conforms to the same specification as that given in regard to the upper mirror 52. The peripheral edges of the mirror 84 are bonded to the body 76.

A ballistic spacer 86 is formed from polycarbonate plastic of premium optical grade, ultra violet stabilized. All optical surfaces are polished in accordance with the same specifications as that used in regard to the upper periscope body 50. The lower periscope edges of the ballistic spacer 86 are bonded to the upper portion of the lower periscope body by transparent adhesive.

The lower periscope body 76 with the lower window 82, lower mirror 84 and ballistic spacer 86 bonded thereto is lowered as a unit into the lower housing 28 and comes to rest against the lower resilient pad 72 (FIGS. 4 and 5). The upper housing 26 receives the upper body 50, upper window 34, and upper mirror 52 when bonded together as a unit as previously described. The two housings are then moved together with the beveled surfaces 44 of the upper flange 42 firmly but releasably engaging the beveled surface 62 of the bottom rim 60 thereby removably connecting the upper housing 26 and lower housing 28 firmly together.

Figure 6:
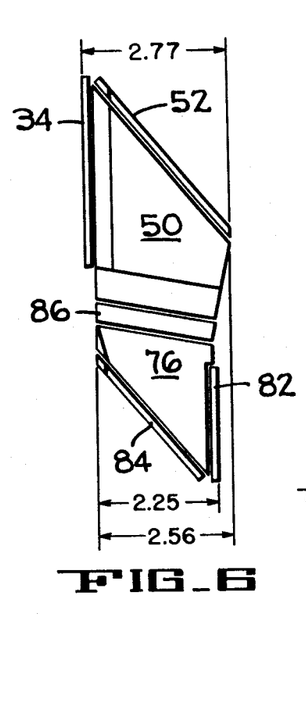
FIG. 6 is a side elevation of the optics within the periscope showing the window's, mirrors, bodies and a ballistic spacer slightly spaced from the other optical bodies for clarity.
Figure 7:
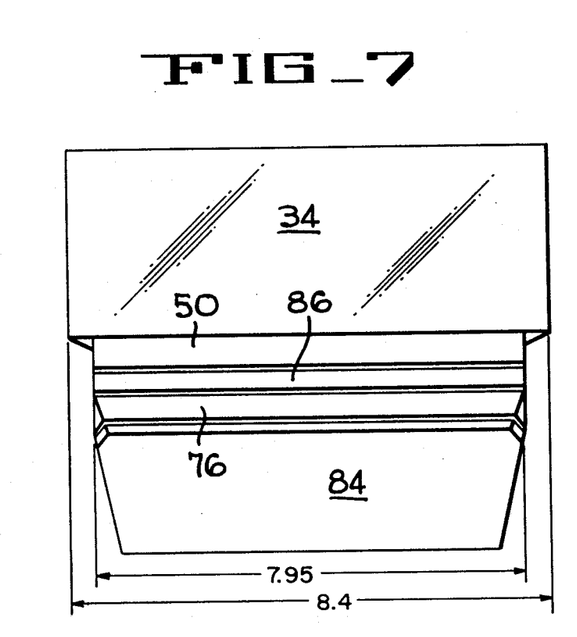
FIG. 7 is a front elevation of FIG. 6 illustrating the shapes of the optics.
Figure 8:
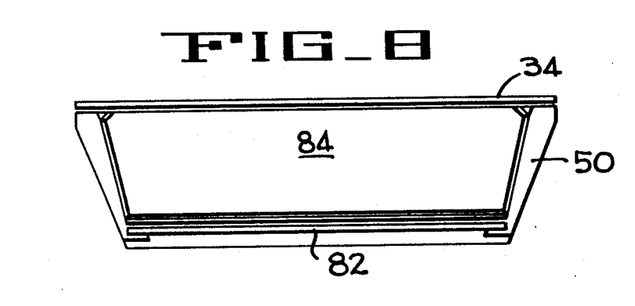
FIG. 8 is a bottom view of FIG. 7.
Figures 9, 10:
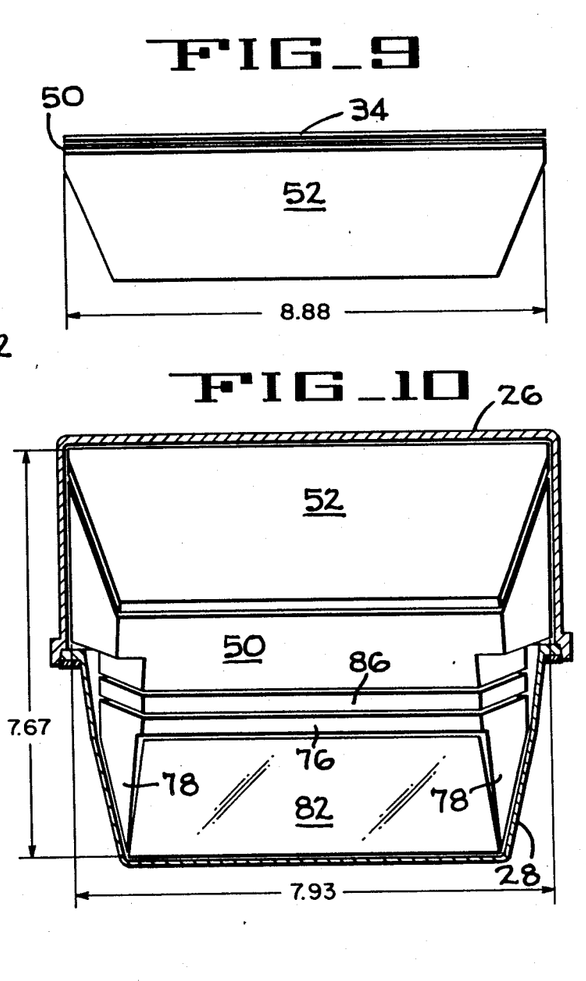
FIG. 9 is a top view of FIG. 6.
FIG. 10 is a rear elevation of the optics shown encased in the widest portions of the periscope's upper and lower housings.
Figure 11:
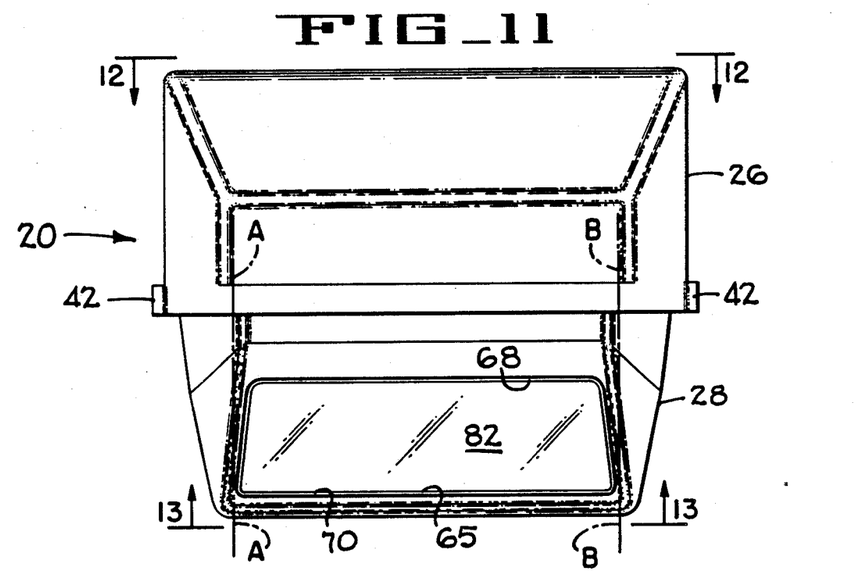
FIG. 11 is a rear elevation of the trapezoidal periscope with the upper and lower housings fitted together.

FIGS. 6-10 also better illustrate the shapes, including certain bevel cuts, in the upper optical body 50 when the upper window 34 and upper mirror 52 are bonded thereto; and to illustrate the lower optical body 76 with the lower window 82, lower mirror 84 and ballistic spacer 86 bonded thereto. The windows, mirrors and ballistic spacers are illustrated as being spaced from their associated periscope bodies for clarity. It will be understood, however, that the peripheral edges of the several optics are bonded to their associated bodies. The spacing for the edge bonding material (not shown) is only about 0.050 of an inch. As used in the specification and claims, the optics of each wide angle trapezoidal periscope 20 includes the upper window 34 (FIGS. 4 and 11) in the upper housing 26, which upper window is the furthest from the observer's eyes (FIGS. 20 and 21) and is thus the front and the widest optical component in the periscope 20. As illustrated in FIG. 9, the widest portion of the preferred upper window 34 and the upper periscope body 50 is 8.88 inches; while the thickest portion of the upper window 34 and the upper periscope body 50 is 2.77 inches. The lower window 82 is the closest to the observer's eyes (FIGS. 20 and 21) and is the narrowest optical component in the lower periscope body 76 which is the lowest portion of the lowest window 82 (FIGS. 5, 6 and 8). The thinnest optical components include the lower end of the lower window 82, and the lower end of the lower mirror 84 which form a very narrow lower edge as illustrated in FIG. 6.

FIG. 10 also illustrates, in section, the position of the upper housing 26 and lower housing 28 at the widest or front portion of the optical assemblies.

Having reference to FIGS. 11-15, it will be noted that reference lines A and B indicate the narrowest transverse width of each trapezoidal opening 29 (FIGS. 3 and 4) in the driver's hatch cover 22, and similar openings in the commander's hatch cover 24. It will also be noted that the upper outward portion of the lower housing 28 below the rim 42 (FIG. 4) is considerably wider than the distance between reference lines A and B. Thus, in order to insert the lower housing 28, which has a trapezoidal gasket 101 fitted thereon, into the trapezoidal opening 29, the trapezoidal periscope must be moved downwardly and outwardly into the trapezoidal opening 29 from above the hatch covers 22 or 24 in the direction indicated by arrow C, FIG. 14, with the wide portion of the lower housing 28 closely adjacent to an outer wall 102 of the trapezoidal opening 29. When placed in operative position as shown in FIG. 4, the upper peripheral surfaces of the lower trapezoidal housing 28 and gasket 101 are snugly fitted relative to the peripheral edges of the trapezoidal opening 29.

As illustrated in FIGS. 2 and 4, a plurality of rim clamps 106 are provided for clamping the four corners of the rims 42 of the upper periscope housings 26 to the driver's hatch cover 22. As illustrated in FIGS. 16-19, each rim clamp 106 includes a capscrew 108 which extends through a cylindrical hole 110 (FIG. 19) in a one piece rim clinching body 112 having a tapered lower end portion 113 connected to an annulus 114 having a pointed end 116 which is received between two adjacent rims 42 (FIG. 16) of the upper trapezoidal housing 26 to prevent rotation of the body 112 when the capscrew is being tightened or loosened. An enlarged arcuate rim clinching flange 118 includes a flat lower rim engaging surface which extends about 190° about its axis. The outer periphery of the arcuate flange 118 is beveled and a portion thereof is received in arcuate grooves 120 (FIGS. 5 and 16) in the outer wall of the upper periscope housing 26 for accurately positioning the periscopes when the capscrews are tightened. Tightening of the four capscrews 108 associated with each trapezoidal periscope 20 partially flattens the gasket 101 (FIG. 4) around the trapezoidal holes 29 in the associated driver's hatch cover 22 (FIG. 1) or commander's hatch cover 24 thereby providing a fluid tight seal preventing rain water and nuclear, biological and chemical contaminates from entering the vehicle V. It will also be noted that when the capscrews are fully tightened the entire periphery of the upper housing 26 comes in contact with the mounting surface around the trapezoidal holes 29, allowing the capscrews to be fully torqued without over compression of the gasket 101. This feature protects the gasket 101 from outside environmental damage.

Figure 20:
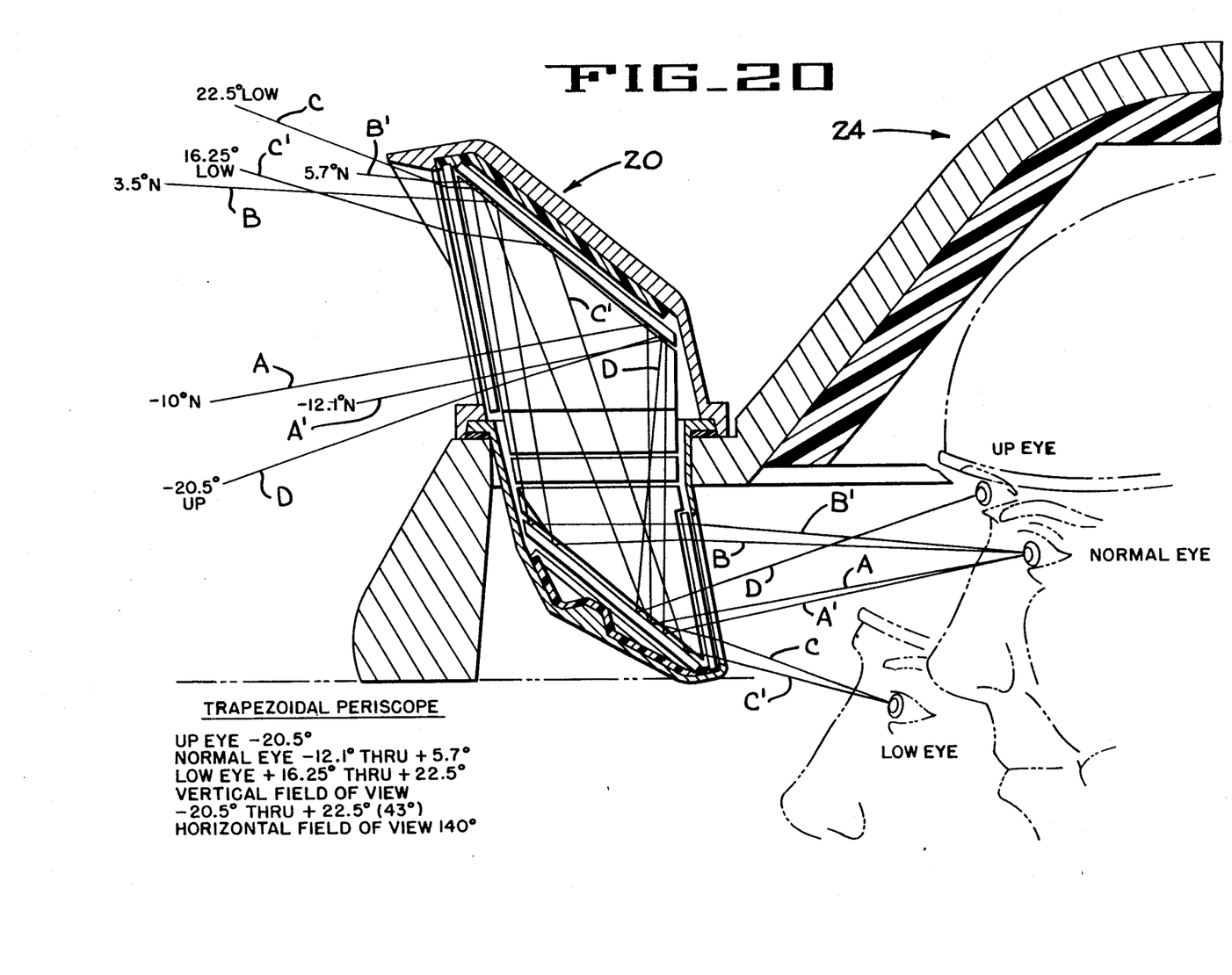
FIG. 20 is a diagrammatic vertical central section through a portion of the commander's hatch cover and a trapezoidal telescope illustrating the vertical field of view relative to a horizontal axis through one periscope by movement of the commander's head and eyes up or down; the vetical field of view being about 43°.

The vertical field of view of the trapezoidal periscope 20 of the present invention is illustrated in FIG. 20 for different positions of the commander's head and eyes, three different eye positions being illustrated.

When the commander's or operator's eyes are in the "normal eye" position the line of sight is illustrated by lines A,A' which provide a normal field of view between $-10°--12.1°$ below the horizontal; and 3.5-5.7 above the horizontal as indicated by lines B and B' when the vehicle V is horizontal thereby providing a normal 17.8° field of view without moving the eyes out of the "normal eye" position.

When the operator moves his eyes to the "low eye" position the line of sight is indicated by lines C and C' or between 22.5° and 16.25° above the horizontal. When the operator's eyes are in the "up eye" position indicated by line D, the line of sight is −20.5° below the horizontal. Thus, the total vertical field of view in response to the operator moving his head and eyes between the three above described positions is about 43°.

Although not illustrated, the total horizontal field of view using the trapezoidal periscope of the present invention is about 140° when the maximum dimension of the optics are equal to or less than that illustrated on FIGS. 6, 7, 9, and 10.

Figures 21, 21A:
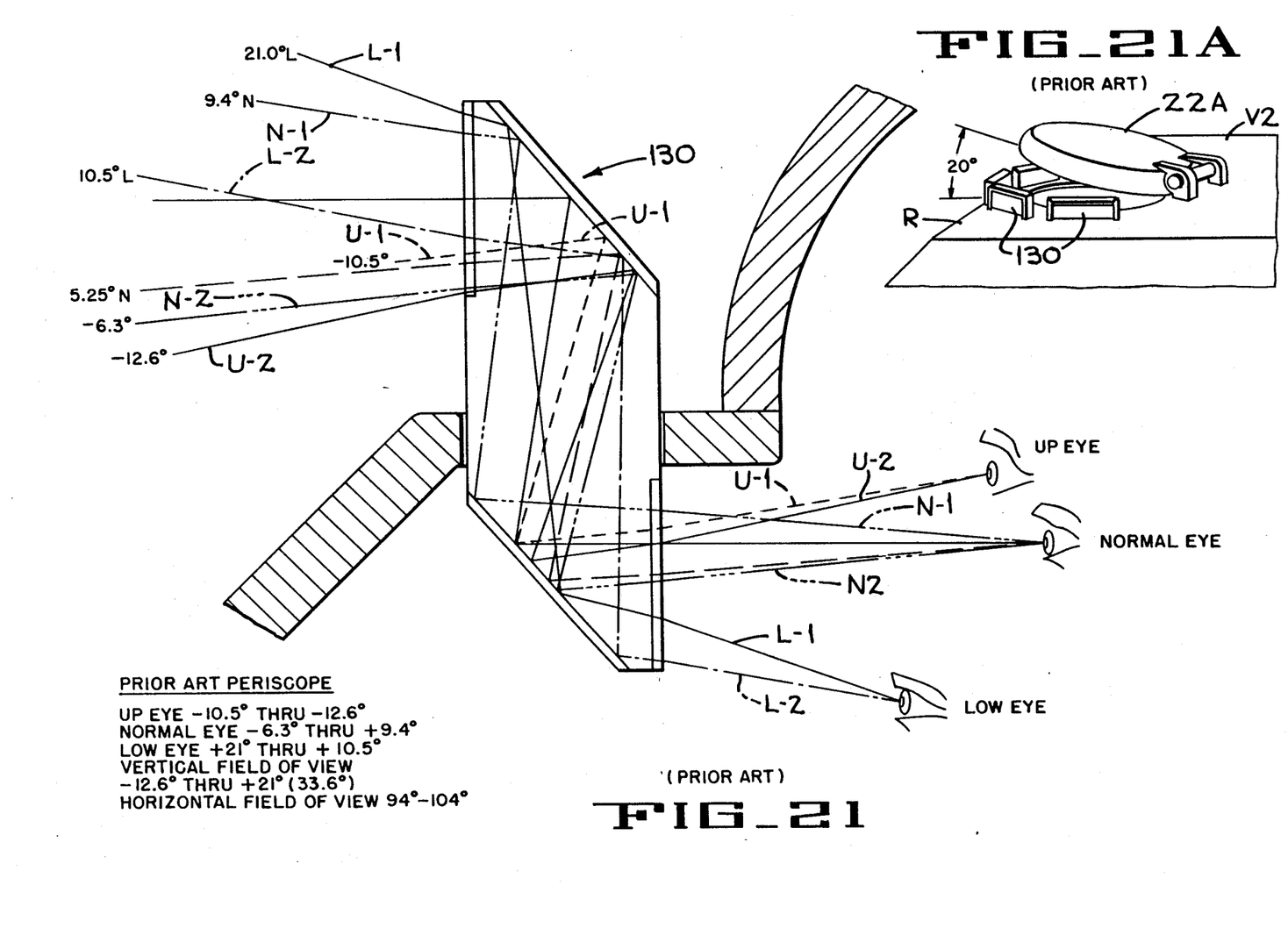
FIG. 21 is similar to FIG. 20 except that a prior art periscope having vertical side walls is illustrated with the vertical field of view being within the range of about $-12.6° - \pm21.0°$.
FIG. 21A is a perspective of the prior art periscopes mounted on the top wall of a military vehicle with the hatch cover in its popped position.

FIGS. 21 and 21A illustrate a prior art periscopes 130 (of the type discussed in the prior art section) each having a size that is similar to that of the trapezoidal periscope of the present invention except that the horizontal cross-section of the periscope is rectangular, not trapezoidal in shape. When viewing at "normal eye" level, lines N-1 and N-2 indicate that the maximum upward line of sight is 9.4° and the maximum lower line of sight is −6.3° below the horizontal. When viewing from the "low eye" position the line of sight is between 21° and 10.5° above the horizontal as indicated by lines L-1 and L-2. When viewing from the "up eye" position, the lines of sight are between −10.5 and −12.6° below the horizontal as indicated by lines U-1 and U-2. Thus, the total vertical field of view is 33.6° with the prior art periscope 130 as compared to 43° with the trapezoidal periscope 20 of the present invention.

The horizontal field of view of the prior art periscope is between 94° and 104° as compared to 140° of the trapezoidal periscope of the present invention.

FIG. 21A illustrates a portion of the top of a prior art military vehicle V2 showing a driver's hatch cover 22A in a relatively wide angle popped position of about 20° with a plurality of prior art periscopes 130 mounted in spaced rectangular opening in the roof R of the vehicle, not in the hatch cover 22A as in the present invention.

Figure 22:
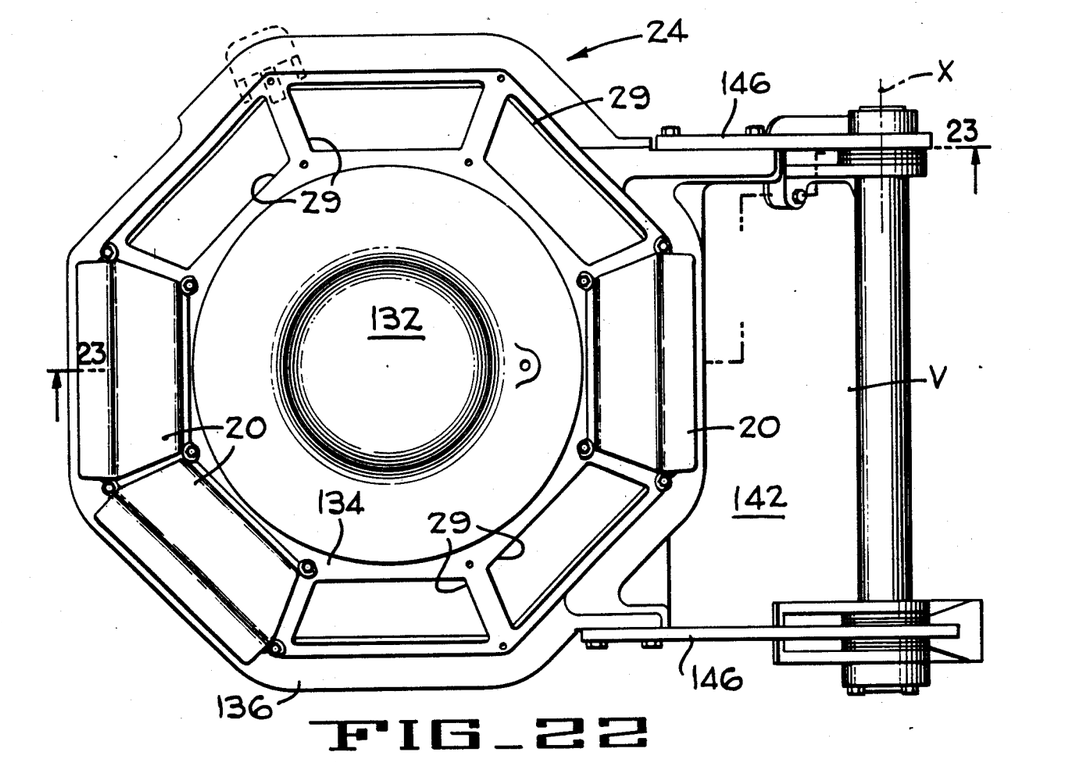
FIG. 22 is a plan view of the commander's hatch cover illustrating a plurality of equally spaced trapezoidal openings in the hatch cover, with trapezoidal periscopes being inserted within three of said openings.
Figure 23:
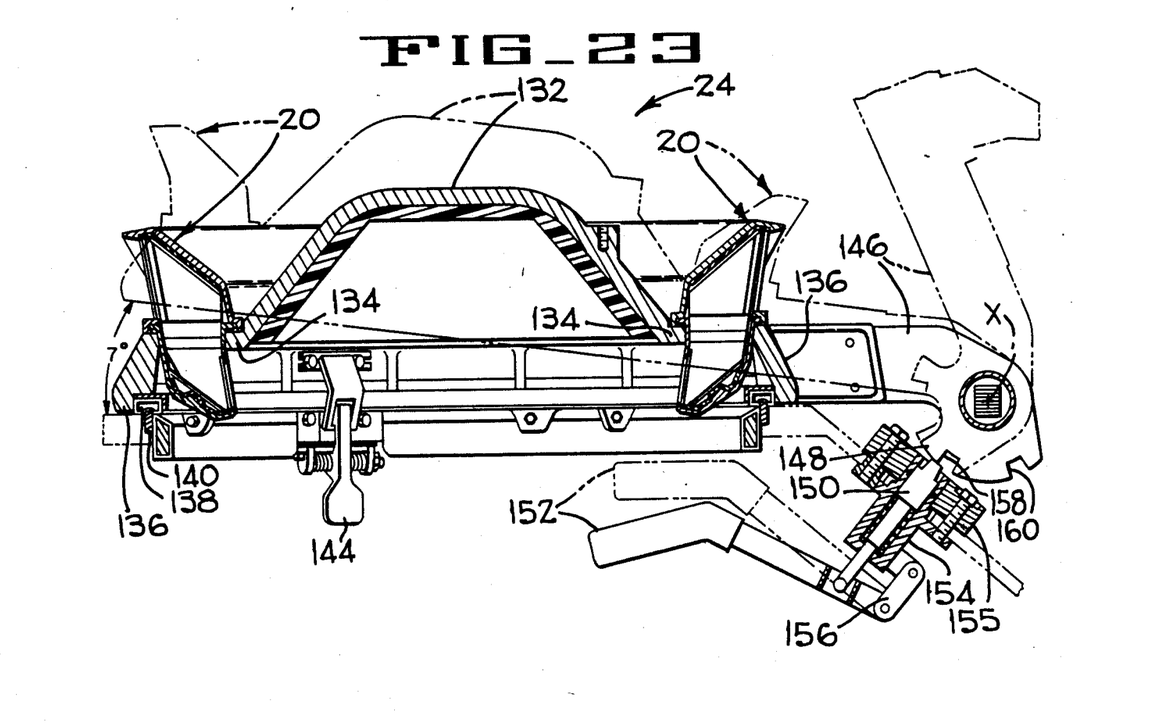
FIG. 23 is a section taken, along lines 23—23 of FIG. 22 illustrating the hatch cover in a closed position, in a popped position, and in an open position.

FIGS. 22 and 23 illustrate the commander's hatch cover 24 of the present invention which includes a dome 132 of sufficient size to accommodate the commander's head. A substantially horizontal rim 134 has a plurality of equally spaced trapezoidal openings 29 therein, each of which receives one of the trapezoidal periscopes 20. A skirt 136 is integral with the rim 134 and includes an annular resilient seal 138 (FIG. 23) which engages a ring 140 secured to the body 142 of the vehicle V thereby providing a fluid tight seal against rain and nuclear, biological, and chemical gases. A conventional latch 144 is provided within the vehicle V to lock the hatch cover 24 in closed position. The hatch cover 24 is bolted to a pair of pivot arms 146 (FIGS. 22 and 23) which are rotatable about a generally horizontal axis X. One of the arms includes a slotted arcuate portion 148 positioned to receive the free end of a spring loaded latch pin 150. A handle 152 is pivoted to the latch pin and the body 154 of a latch assembly 155 by a pivotal link 156.

When it is desired to slightly open the hatch cover 24 (i.e., pop the hatch cover) the operator releases the hatch cover 144 allowing the forward end of the hatch cover to open about 7° until the latch pin enters a first slot 158 allowing the operator to see forward without using the periscopes. The operator may lower the handle 152 to withdraw the pin 150 from the first slot 158 and move the hatch to its fully open position at which time the pin 150 enters the second slot 160. When the prior art hatch 22A in the "popped" position as illustrated in FIG. 21A, the hatch cover 22A is opened about 20°.

Since the periscopes 20 of the present invention are mounted on the hatches cover 22 and 24 (FIG. 1) rather than the bodies of the vehicle, V, it is apparent that the angle at which the hatch cover of the present invention are opened when in the "popped" position is much less than that required when the periscopes are mounted on the upper wall of the vehicle V, as is conventional in the art, since the driver or commander must open the hatch cover sufficiently to see over the conventional periscopes. Thus, positioning the trapezoidal periscopes 20 on either hatch cover 22 or 24 allows better protection for the driver and commander from small arms fire or the like and permits desirable circulation of air within vehicles which are not air conditioned.

From the foregoing description it is apparent that the trapezoidal periscope of the present invention includes an upper trapezoidal housing which is larger in length, width, and height as compared to the lower housing. Since the lower trapezoidal housing is smaller than the upper housing a major portion of the lower housing is inserted within the associated trapezoidal opening in the rim of the driver's hatch cover or commander's hatch cover. The lower housing is sealed by a compressible trapezoidal gasket to the associated trapezoidal opening. Rim clamps are positioned to clamp against and accurately center the four corners of the upper housing with the associated trapezoidal opening permitting the trapezoidal sides of the adjacent wider upper housings to be within less than about ⅛th of an inch from adjacent upper housings thus permitting individual and quick removal and replacement of damaged periscopes from the top of the vehicle. Each upper housing window includes a laser filter and is angled about 10° downwardly and inwardly from a vertical plane for minimizing reflection of sun light and laser beams for protecting the crew's eye sight. A transparent polycarbonate spacer in the periscope prevents ballistic fragments and shock waves from entering the vehicle, and an integral blackout cover is attached to the lower trapezoidal housing.

Although the best mode contemplated for carrying out the present invention has been herein shown and described, it will be apparent that modification and variation may be made without departing from what is regarded to be the subject matter of the invention.

What is claimed is:

1. A wide angle trapezoidal periscope comprising:
   means defining an upper trapezoidal housing having an upper window opening therein;
   means defining a lower trapezoidal housing having a lower window opening therein;
   means for directly connecting adjacent surfaces of said upper trapezoidal housing and said lower trapezoidal housing together; and
   means defining transparent optics within said upper and lower trapezoidal housings including upper and lower windows adjacent said upper and lower window openings, upper and lower trapezoidal periscope bodies, a ballistic spacer between said upper and lower periscope bodies, and upper and lower mirrors adjacent said upper and lower housings for providing wide angle vertical and horizontal fields of view, said transparent upper and lower periscope bodies within said upper and lower trapezoidal housings increasing in width and thickness from said lower window opening to said upper window opening.

2. An apparatus according to claim 1 wherein said wide angle vertical field of view is at least 43° and wherein said wide angle horizontal field of view is at least 140°.

3. An apparatus according to claim 1 wherein said upper and lower windows are parallel to preclude distortion of a scene being viewed.

4. An apparatus according to claim 2 wherein said upper and lower mirrors are parallel.

5. A wide angle trapezoidal periscope comprising:
means defining an upper trapezoidal housing having an upper window opening therein;
means defining a lower trapezoidal housing having a lower window opening therein;
means for directly connecting adjacent surfaces of said upper trapezoidal housing and said lower trapezoidal housing together, and
means defining optics within said upper and lower trapezoidal housings including upper and lower transparent windows adjacent said upper and lower window openings, and upper and lower mirrors adjacent said upper and lower trapezoidal housings for providing wide angle vertical and horizontal fields of view;
wherein said wide angle trapezoidal periscope is mounted on a military vehicle and wherein said optics additionally comprises transparent upper and lower trapezoidal bodies, said upper window and said upper mirror being bonded to said transparent upper body; a transparent lower body having said lower window, and said lower mirror being bonded to said lower body; and a transparent ballistic spacer bonded to at least said transparent lower body.

6. An apparatus according to claim 5 wherein said upper window is formed from glass which includes a laser filter for protecting the eyesight of crew members from low to moderate intensity lasers.

7. An apparatus according to claim 5 wherein said upper trapezoidal housing is mounted on said military vehicle at an angle of at least 10° from a vertical plane for reflecting sunlight downwardly thereby minimizing reflection and improving vehicle concealment.

8. An apparatus according to claim 7 and additionally comprising a substantially horizontal overhanging visor for protecting said upper window from falling objects and rain.

9. An apparatus according to claim 5 wherein said lower window is formed from a hard coated transparent methacryolate plastic which eliminates the possibility of glass fragments entering a crew member's eyes by a ballistic impact into the periscope.

10. An apparatus according to claim 5 wherein said ballistic spacer is formed from transparent polycarbonate that precludes ballistic fragments and shock waves from entering the military vehicle through said wide angle trapezoidal periscope.

11. A periscope having a trapezoidal cross section comprising:
means defining an upper trapezoidal housing having a first generally L-shaped annular rim with first beveled inner surfaces on two parallel edges of said upper trapezoidal housings, said upper trapezoidal housing having two non-parallel walls having angled lower inner edges;
means defining a lower trapezoidal housing smaller than that of said upper trapezoidal housing and having an annular rim with a beveled outer surface complementary with said first beveled inner surface on said two parallel edges of said upper housing and also having third beveled surfaces on non-parallel walls of said second annular rim which engage and seal against said two non-parallel walls of said upper trapezoidal housing;
an upper transparent body;
a large window bonded to said upper transparent body;
a large mirror bonded to said upper transparent body, said upper transparent body with said large window and mirror bonded thereto being fitted within said upper trapezoidal housing;
a small lower transparent trapezoidal body;
a small lower window bonded to said lower transparent body;
a small lower mirror bonded to said lower transparent body;
means defining a ballistic spacer bonded to said lower transparent body;
said lower transparent body with said small window, said small mirror, and said ballistic spacer being bonded together and being inserted within said lower trapezoidal housing, and said upper and lower trapezoidal housing being secured together to define a periscope having wide vertical and horizontal fields of view.

12. A wide angle periscope comprising:
means defining an upper trapezoidal body which diminishes in width and thickness from an upper end of the upper trapezoidal body to a lower end of said upper trapezoidal body to a lower end of said upper trapezoidal body;
means defining a lower trapezoidal body which diminishes in width and thickness from an upper end of said lower trapezoidal body to a lower end of said lower trapezoidal body; and
means defining optics within said upper body and said lower body which decreases in width and thickness from said upper end of said upper trapezoidal body to said lower end of said lower body for providing a wide horizontal field of view and a wide large vertical field of view.

13. A wide angle periscope according to claim 12 wherein said horizontal field of view is 140 degrees and wherein said vertical field of view is 43 degrees.

* * * * *